United States Patent [19]
Vickery

[11] Patent Number: 6,027,550
[45] Date of Patent: *Feb. 22, 2000

[54] APPARATUS AND METHOD FOR REMOVING VOLATILE ORGANIC COMPOUNDS FROM A STREAM OF CONTAMINATED AIR WITH USE OF AN ADSORBENT MATERIAL

[75] Inventor: Earl C. Vickery, San Jose, Calif.

[73] Assignee: TecHarmonic, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,590

[22] Filed: Apr. 28, 1997

[51] Int. Cl.$^7$ ................................................. B01D 53/10
[52] U.S. Cl. ................................ 95/107; 95/110; 95/143; 96/123; 96/144; 96/150; 422/143; 422/144; 422/145; 422/311
[58] Field of Search ............................. 95/107–111, 114, 95/115, 141, 143–147; 96/122, 123, 130, 143, 144, 146, 150; 422/143–145, 311

[56] References Cited

U.S. PATENT DOCUMENTS

| | | | |
|---|---|---|---|
| 1,522,480 | 1/1925 | Allen | 95/112 |
| 1,547,924 | 7/1925 | Kerschbaum | 95/110 |
| 2,270,903 | 1/1942 | Rudbach | 95/109 |
| 2,397,566 | 4/1946 | Schutte | 96/123 |
| 2,522,426 | 9/1950 | Black | 95/109 |
| 2,636,574 | 4/1953 | Widdowson et al. | 95/143 X |
| 2,834,429 | 5/1958 | Kinsella, Jr. et al. | 95/108 |
| 2,921,970 | 1/1960 | Gilmore | 95/111 X |
| 3,177,631 | 4/1965 | Tamura | 55/28 |
| 3,798,876 | 3/1974 | Kennedy | 55/59 |
| 3,829,983 | 8/1974 | White | 422/143 X |
| 3,867,114 | 2/1975 | Doig | 95/108 |
| 3,892,551 | 7/1975 | Burnham | 55/390 |
| 3,918,932 | 11/1975 | Lee et al. | 95/146 X |
| 3,977,846 | 8/1976 | Russell et al. | 95/108 |
| 4,047,906 | 9/1977 | Murakami et al. | 95/109 |
| 4,061,477 | 12/1977 | Murakami et al. | 95/109 |
| 4,147,523 | 4/1979 | Izumo | 55/208 |
| 4,207,082 | 6/1980 | Okamoto et al. | 55/60 |
| 4,231,764 | 11/1980 | Mattia | 55/28 |
| 4,257,783 | 3/1981 | Gutjahr et al. | 55/61 |
| 4,259,094 | 3/1981 | Nagai et al. | 55/181 |
| 4,409,006 | 10/1983 | Mattia | 95/141 X |
| 4,863,494 | 9/1989 | Hayes | 55/59 |
| 4,869,734 | 9/1989 | Jacquish | 55/60 |

(List continued on next page.)

FOREIGN PATENT DOCUMENTS

| | | | |
|---|---|---|---|
| 0479931 | 1/1952 | Canada . | |
| 0847768 | 10/1939 | France | 95/110 |
| 0533037 | 9/1931 | Germany . | |
| 0831093 | 2/1952 | Germany | 96/150 |
| 0877445 | 5/1953 | Germany . | |
| 0883743 | 7/1953 | Germany | 96/150 |
| 1006397 | 4/1957 | Germany . | |
| 2720120 | 11/1977 | Germany | 95/109 |
| 3813517 | 11/1989 | Germany | 95/111 |
| 51-046577 | 4/1976 | Japan | 95/109 |
| 52-043777 | 4/1977 | Japan | 95/108 |
| 54-100976 | 8/1979 | Japan . | |
| 4-225814 | 8/1992 | Japan | 95/108 |
| 1219121 | 3/1986 | U.S.S.R. | 95/108 |

*Primary Examiner*—Robert Spitzer
*Attorney, Agent, or Firm*—Carr & Ferrell LLP

[57] ABSTRACT

An apparatus and method for removing volatile organic compounds (VOCs) from a stream of contaminated air using an adsorbent material. The stream of contaminated air is introduced into an end of a first hollow member which contains the adsorbent material. A perforated member disposed within the hollow member is configured to increase the air stream velocity such that dispersed particles of the adsorbent material are entrained in the air stream. Entrainment of the adsorbent in the contaminated air stream facilitates efficient removal of the VOCs. The cleaned air stream exits from a second end of the first hollow member, and the adsorbent material, having a quantity of VOCs adsorbed thereon, is directed to a reconditioning apparatus wherein the VOCs are thermally desorbed. The reconditioned adsorbent material is then returned to the first hollow member.

43 Claims, 8 Drawing Sheets

U.S. PATENT DOCUMENTS

| | | | |
|---|---|---|---|
| 4,902,311 | 2/1990 | Dingfors et al. | 55/60 |
| 4,946,479 | 8/1990 | Izumo | 55/181 |
| 5,069,689 | 12/1991 | Goldhaar | 96/123 X |
| 5,238,658 | 8/1993 | Makioka et al. | 95/90 |
| 5,288,307 | 2/1994 | Goltz et al. | 95/143 |
| 5,460,789 | 10/1995 | Wilhelm | 422/173 |
| 5,464,597 | 11/1995 | Tang | 95/108 X |
| 5,496,395 | 3/1996 | Yamazaki | 96/123 |
| 5,527,512 | 6/1996 | Bachtel et al. | 422/143 |
| 5,538,541 | 7/1996 | Vickery | 96/123 |
| 5,603,904 | 2/1997 | Bachtel et al. | 422/311 X |
| 5,667,559 | 9/1997 | Vickery | 95/110 |
| 5,676,738 | 10/1997 | Cioffi et al. | 95/109 |

APPARATUS AND METHOD FOR REMOVING VOLATILE ORGANIC COMPOUNDS FROM A STREAM OF CONTAMINATED AIR WITH USE OF AN ADSORBENT MATERIAL

BACKGROUND OF THE INVENTION

1. Field of the Invention

The present invention relates generally to an apparatus and method for purifying contaminated air, and more specifically to an apparatus and method for removing organic contaminants from an airstream by using adsorbent material.

2. Description of the Background Art

Volatile Organic Compounds (VOCs) are pervasive in today's technological society. VOCs are created as by-products in the electronics and other industries and may include chlorinated solvents, alcohol, esters, and acids. For VOCs that are released as contaminants into the atmosphere, a number of systems exist for their removal. These systems include fixed bed adsorbers and fluidized bed adsorbers. In both fixed and fluidized bed adsorption systems, the VOC-contaminated atmosphere or airstream is passed through a bed of adsorbent particles. The particles decontaminate the airstream by adsorbing the VOCs from the airstream. The VOCs are subsequently removed or desorbed from the particles in a manner that prevents the VOCs from being released back into the surrounding environment.

The most common adsorbent material has been activated carbon particles. Other adsorbent particles that may be used to clean a VOC-contaminated airstream or atmosphere include zeolite and polymeric adsorbents.

In typical fixed bed adsorber systems, the VOC-contaminated atmosphere passes through canisters containing adsorbent particles. The VOC-contaminated airstream enters one end of the canister by way of a conduit and passes through a bed of adsorbent particles. The VOCs in the contaminated airstream are deposited onto the adsorbent particles by adsorption or absorption, or a combination of both. The decontaminated airstream then exits the canister by way of a second conduit typically located at a second end of the canister.

Fixed bed adsorber systems are expensive to maintain. The containers in the fixed bed adsorber systems must be periodically removed so that the adsorbent particles in the containers may be desorbed after the particles become saturated with VOCs. Fixed bed adsorption systems also have the disadvantage that the adsorbent particles maintain contact with each other, thus reducing the exposed surface area of each particle that is available for adsorption of VOCs. Additionally, in forcing the contaminated atmosphere through the canister, the packed nature of the adsorbent particles requires fixed bed adsorption systems to provide a significant amount of air pressure.

In fluidized bed adsorption systems, the VOC-contaminated atmosphere is passed through adsorbent particles resting on perforated trays. The perforations allow VOC-contaminated air to pass through the trays without allowing the adsorbent particles to fall through the holes. As the velocity rate of the contaminated air passing through the bed is increased, the adsorbent particles separate slightly from each other and expose more of their surfaces to the airstream. At some point, the air velocity causes the adsorbent particles to act as a fluid, and to form localized bubbles that appear as if the particles are boiling. The dynamic movements of the bubbles increase the surface area of an adsorbent particle that will be exposed to the VOC-contaminated air flow. U.S. Pat. No. 4,902,311, issued on Feb. 20, 1990, discloses an apparatus having an adsorption chamber with fluidized beds, and a desorption chamber coupled to the adsorption chamber. U.S. Pat. No. 4,902,311 is fully incorporated herein by reference thereto as if repeated verbatim hereinafter.

The fluidized bed adsorption method and system decrease the air pressure required to move the contaminated airstream through the adsorbent and has better contact efficiency than a fixed bed adsorber. However, as in fixed bed adsorption systems, the entire surface area of the adsorbent particles is not exposed to the contaminated atmosphere. Since only the surfaces of the bubbles are exposed, the amount of VOCs adsorbed onto the particles and removed from the VOC-contaminated air is limited. Another problem with fluidized bed systems is that two or more beds must be used so that the bubbles created in the first bed are broken by the next bed in order to expose more of the contaminated air to the adsorbent particles.

In both fixed and fluidized bed adsorption systems, when the adsorbent particles become saturated with VOCs, the adsorbent particles require replacement or reconditioning. In a typical VOC reconditioning, the VOCs are desorbed by subjecting the VOC-saturated adsorbent particles to heat. As with adsorption of VOCs from a VOC-contaminated atmosphere, the adsorbent particles are in a packed state during the desorption process. This packed state limits the amount of surface area of an adsorbent particle that is exposed to the heat, thereby reducing the amount of VOCs desorbed from an adsorbent particle.

VOCs may be removed from a VOC-contaminated airstream by causing the adsorbent particles to become entrained in the VOC-contaminated airstream. By causing the adsorbent particles to be entrained, a surface of an adsorbent particle is separated from the surface of the other adsorbent particles. Thus by causing the adsorbent particles to be entrained, the surface areas of the adsorbent particles can have about 100% contact with the VOCs in the VOC-contaminated airstream. To permit the surface areas of the adsorbent particles to be fully exposed to the VOC-contaminated airstream results in an efficient adsorption method. Other adsorber and desorber systems are discussed in commonly assigned U.S. Pat. No. 5,538,541, issued on Jul. 23, 1996 and U.S. patent application Ser. No. 08/644,327, filed on May 10, 1996, now U.S. Pat. No. 5,667,559, all of which are fully incorporated herein by reference thereto as if repeated verbatim hereinafter.

Thus, what is needed and what has been invented is an apparatus and method that overcome these problems and increase the amount of VOCs removed from a VOC-contaminated atmosphere.

SUMMARY OF THE INVENTION

The present invention provides for an apparatus and method for removing volatile organic compounds from a stream of contaminated air with use of an adsorbent material. The apparatus of the present invention comprises a first hollow member for containing a stream of contaminated air and an adsorbent material. The first hollow member has a first end into which the stream of contaminated air is forced at a predetermined velocity rate and has a second end from which clean air is released. A perforated member is disposed between the first end and the second end of the first hollow member. The perforated member is used for increasing the predetermined velocity rate of the stream of contaminated air such that the adsorbent material is suspended in the stream. The adsorbent material which is suspended in the stream adsorbs volatile organic compounds in the stream to produce clean air; and as a result, clean air is released from the second end of the first hollow member. A second hollow member is coupled to the first hollow member and to a heat source, for reconditioning the adsorbent material. The second hollow member is adapted to receive the adsorbent material which contains the volatile organic compounds, and is also adapted to remove the volatile organic compounds from the adsorbent material which is saturated with VOCs. The VOC-saturated adsorbent material in the second hollow member is reconditioned by being exposed to a heated airstream within the second hollow member. The second hollow member is also adapted to emit into a heat source the volatile organic compounds which are removed from the VOC-saturated adsorbent material.

The present invention excels in efficiency because the adsorbent material is suspended within the first hollow member which contains the stream of contaminated air such that the whole surface area of the adsorbent material is exposed to the stream of contaminated air. The pressure required to move the stream of contaminated air within the first hollow member is also considerably less than that of conventional adsorber systems. The apparatus of the present invention also requires less moving mechanical parts or components than conventional adsorber and desorber systems.

The apparatus of the present invention further includes a mesh member which is disposed adjacent to the perforated member. The mesh member acts as a reservoir for the adsorbent material, thereby reducing the amount of adsorbent material that must be desorbed and recycled as required in conventional adsorber and desorber systems. The mesh member also reduces the frequency that the adsorbent material must be recycled from the desorber to the adsorber, as required in conventional adsorber and desorber systems.

The stream of contaminated air in the first hollow member is driven by air pressure from a main fan located outside the first hollow member. The perforated member increases the velocity rate of the stream in the first hollow member, without requiring the air pressure from the main fan to be increased for adsorbing the VOCs in the stream of contaminated air. By not requiring the air pressure from the main fan to be increased, this invention is more energy efficient than conventional adsorber systems. In addition, the cross-sectional area of the second hollow member can be set at about 1/40 or less of the cross-sectional area of the first hollow member. By decreasing the cross-sectional area of the second hollow member, the airflow in the second hollow member is reduced, thereby resulting in additional energy savings for the present invention.

The present invention broadly provides a method of removing volatile organic compounds from a stream of contaminated air with use of an adsorbent material, including the steps of: (a) forcing a stream of contaminated air through a first hollow member having a first end into which the stream is forced at a predetermined velocity rate and a second end from which clean air is released; (b) providing an adsorbent material in the first hollow member of step (a); (c) increasing the predetermined velocity rate in step (a) such that the adsorbent material is suspended in and mixed with the stream; (d) removing the adsorbent material which contains the volatile organic compounds from the first hollow member; and (e) desorbing the volatile organic compounds from the adsorbent material which contains the volatile organic compounds in step (d) in a second hollow member.

It is therefore an object of the present invention to provide an apparatus for removing volatile organic compounds from a stream of contaminated air. It is another object of the present invention to provide a method for removing volatile organic compounds from a stream of contaminated air.

These, together with the various ancillary advantages and features which will become apparent to those possessing the ordinary skill in the art as the following description proceeds, are attained by this novel system and method for removing volatile organic compounds from a stream of contaminated air, a preferred embodiment being shown with reference to the accompanying drawings, by way of example only, wherein:

DETAILED DESCRIPTION Of A PREFERRED EMBODIMENT

Figure 1:
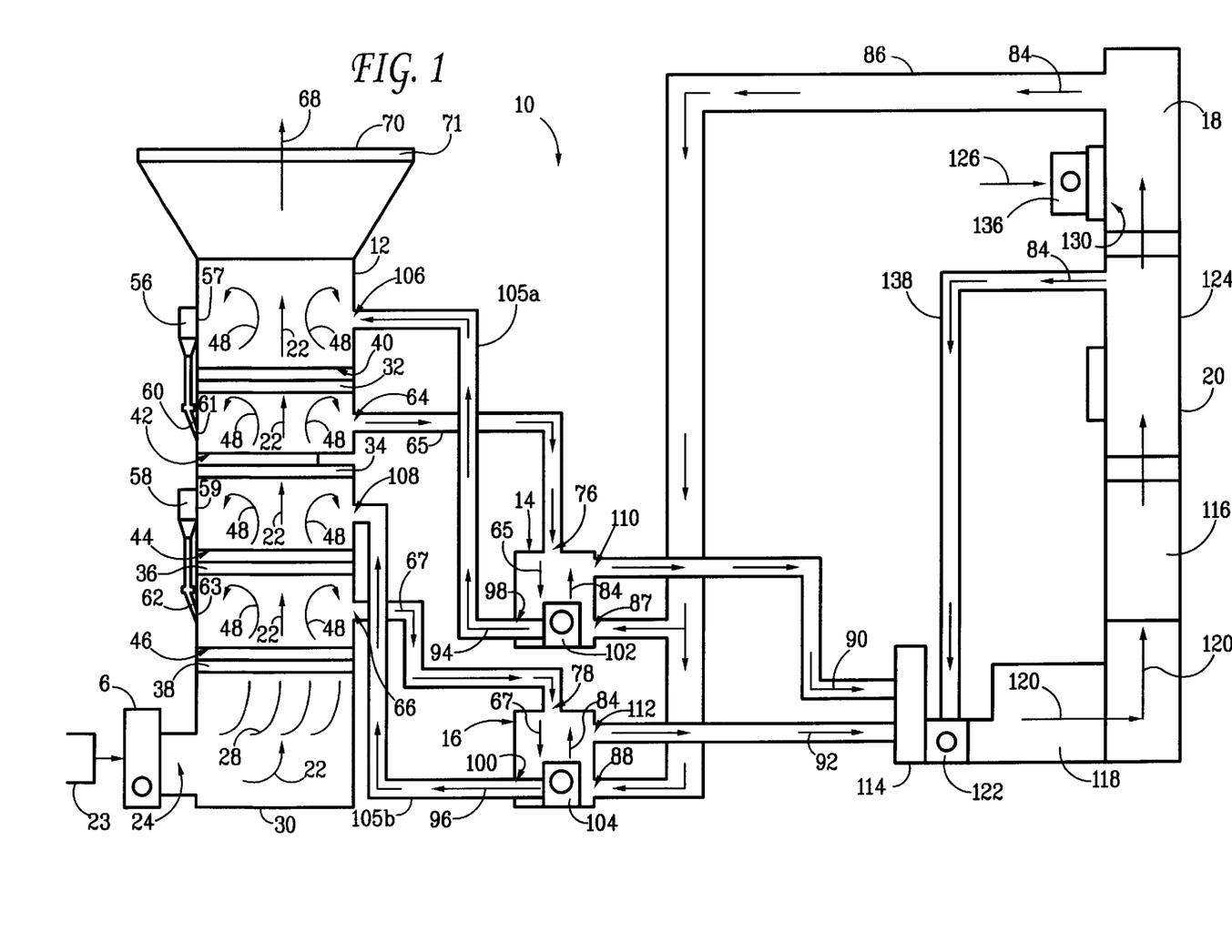
FIG. 1 is a side elevational view of a system for removing volatile organic compounds from an airstream in accordance with a preferred embodiment of the present invention.

Referring in detail now to the drawings wherein similar parts of the present invention are identified by like reference numerals, there is seen a system, assembly or apparatus, generally illustrated as 10, for removing volatile organic compounds (VOCs) from a stream of contaminated air with use of an adsorbent material. In a preferred embodiment of the present invention and as best shown in FIG. 1, the system 10 of this invention has an adsorber 12, desorber systems 14 and 16 coupled to the adsorber 12, a heat exchanger 18 coupled to the desorber systems 14 and 16, and a thermal oxidizer 20 coupled to the desorber systems 14 and 16 and to the heat exchanger 18. In a preferred embodiment, the adsorber 12 is a hollow column member, preferably rectangular, which is constructed from 16 awg 304 stainless steel. The VOC-contaminated airstream 22, typically industrial ventilation or exhaust air containing organic substances, enters from a VOC-contaminated airstream source 23 to an inlet port 24. The VOC-contaminated airstream 22 is driven by air pressure from a main fan 26 into and through the adsorber 12.

The adsorber 12 preferably includes vanes 28 which are curved 204 stainless metal members that may be attached near the bottom end 30 of the adsorber 12. The vanes 28 are adjustable and functionally positioned to evenly distribute the flow of the VOC-contaminated airstream 22 through the perforated plates 32, 34, 36, and 38, and the mesh screens 40, 42, 44 and 46. The mesh screens 40, 42, 44 and 46 are located adjacent to the perforated plates 32, 34, 36 and 38, respectively. The mesh screens 40, 42, 44 and 46 allow the VOC-contaminated airstream 22 to pass through the adsorber 12 while preventing the adsorbent particles 48 from falling through the perforations 200, 202, 204 and 206 (see FIG. 3) in the respective perforated plates 32, 34, 36 and 38.

Figure 2A:
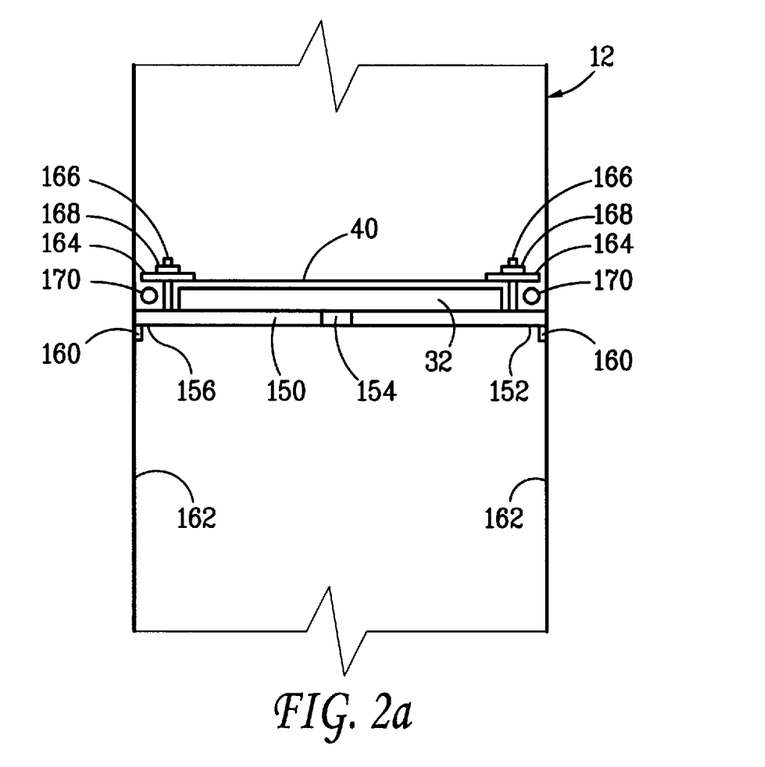
FIG. 2a is a front elevational view of a perforated plate and mesh screen mounted inside the adsorber of the present invention.

As best illustrated in FIG. 2a, a mesh screen 40 is disposed above a perforated plate 32. A cross bar 150 supports the perforated plate 32 in the adsorber 12. The cross bar 150 is preferably a flat stock cross-shaped member with the ends 152, 154 and 156 and an end 158 (see FIG. 2b). The ends 152, 154, 156 and 158 (see FIG. 2b) are welded to a lower supporting member 160. The lower supporting member 160 is preferably a flat stock welded on the inside wall 162 of the adsorber 12.

The perforated plate 32 and the mesh screen 40 are secured between the cross member 150 and an upper supporting member 164. The bolts 166 with the corresponding locking nuts 168 are used so that the perforated plate 32 and the mesh screen 40 are clamped between the cross bar 150 and the upper supporting member 164. The sealer gaskets 170 are used further to secure the perforated plate 32 and the mesh screen 40 between the cross bar 150 and the upper supporting member 164.

Figure 2B:
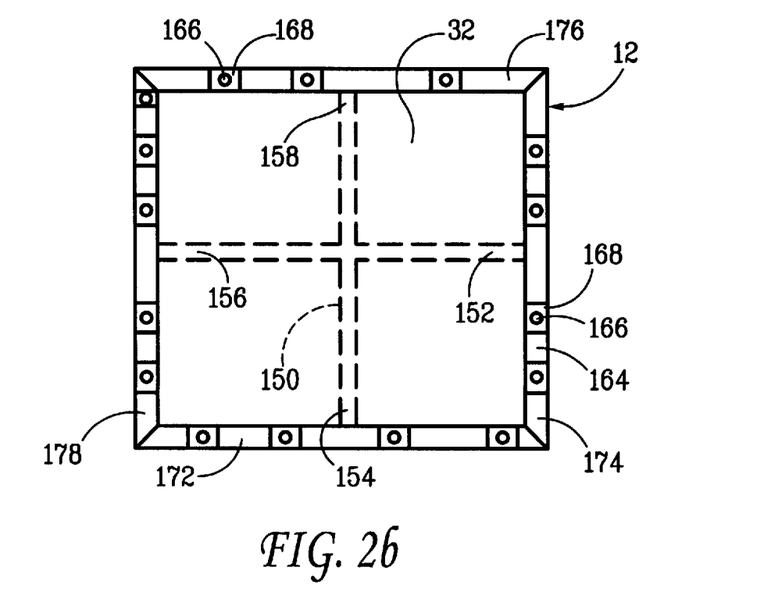
FIG. 2b is a top view of a perforated plate mounted inside the adsorber of the present invention.

FIG. 2b is a top view of the adsorber 12 as seen from above the perforated plate 32. The bolts 166, with the corresponding locking nuts 168, are evenly spaced with reference to the upper supporting member 164. The upper supporting member 164 is shown to further include the four rectangular members 172, 174, 176 and 178, preferably made of a flat stock. The rectangular members 172 and 176 are both attached to the rectangular members 174 and 178.

Referring back to FIG. 1, the adsorbent particles, generally represented by and flowing in the directions of the curved arrows 48, are layered on the wire mesh screens 40, 42, 44 and 46, prior to forcing the VOC-contaminated airstream 22 into the adsorber 12. The adsorbent particles 48 are preferably macroporous polymeric particles. In the exemplary embodiment, the adsorbent particles 48 are a polymeric adsorbent from Dow Chemical Company designated as Dow XUS-43493.01, which has an apparent density of 0.34 grams per cubic centimeter and a particle distribution size of 20–50 mesh. Examples of other polymeric adsorbents that can be used in the system 10 include, but are not limited to: Dow Chemical XUS-43493.01, XUS-43493.00, XUS-43502-01, Chematur Bonopore 110,1120, and Rohm & Haas Ambersorb Carbonaceous Adsorbents. Some examples of VOCs that can be removed by the system 10 using the above-mentioned adsorbents are: isopropyl alcohol, ethyl lactate, benzene, toluene, styrene, perchloroethylene, trichloroethylene, methylene chloride, methyl ethyl ketone, acetone, butyl acetate, and xylene.

Typically, one continuous layer of the adsorbent particles 48 is layered on the mesh screens 40, 42, 44 and 46, prior to forcing the VOC-contaminated airstream 22 through the inlet port 24. The thickness of the layer of the adsorbent particles 48 is preferably from about 1.0 to about 2.0 inches, but may range from about 0.5 inches to about 6.0 inches. The thickness of the layer of the adsorbent particles 48 placed on the mesh screens 40, 42, 44 and 46 will depend partly on the type of polymer which is used for the adsorbent particles 48, and will depend partly on the type of volatile organic compounds to be adsorbed by the adsorbent particles 48. For example, at a concentration of about 1000 parts per million, the Dow XUS-43493.01 will adsorb about 20% by weight of alcohol (e.g., isopropyl alcohol). In contrast, the Dow XUS-43493.01 will absorb a lesser percentage by weight for acetone. Consequently, a thicker layer of the adsorbent particles 48 to be disposed on the mesh screens 40, 42, 44 and 46 would be preferred if the VOCs to be removed from the VOC-contaminated airstream 22 include acetone. The other factor to consider when determining the amount of the adsorbent particles 48, to be layered on the mesh screens 40, 42, 44 and 46, is the temperature of the VOC-contaminated airstream 22. The VOC-contaminated airstream 22 is preferably at room temperature. If the VOC-contaminated airstream 22 is at higher temperatures, then preferably the thickness of the layer of the adsorbent particles 48 on the mesh screens 40, 42, 44 and 46 will be increased to compensate for the reduced capacity of the adsorbent particles 48 to adsorb VOCs.

Figure 3:
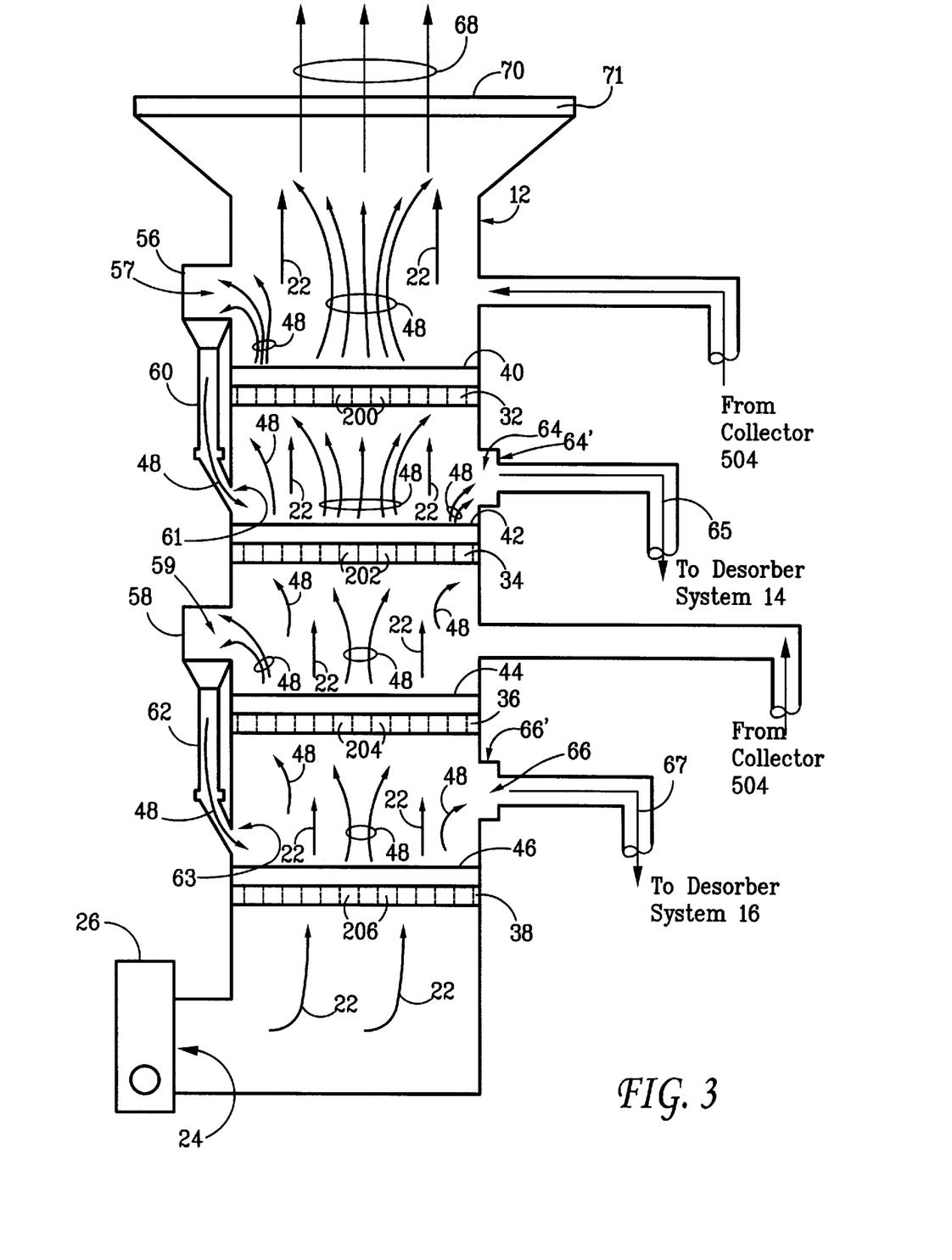
FIG. 3 is a front elevational view of the adsorber of the present invention.

Reference is now made to FIG. 3, which shows the adsorber 12 in additional detail. As the VOC-contaminated airstream 22 passes through the perforations 200, 202, 204 and 206 of the respective perforated plates 32, 34, 36 and 38, and through the mesh screens 40, 42, 44 and 46, the velocity rate of the VOC-contaminated airstream 22 increases at areas of the adsorber 12 above the mesh screens 40, 42, 44 and 46. This velocity increase is due to the following. The cross-sectional area in the adsorber 12 for the air flow of the VOC-contaminated airstream 22 is reduced by the perforations 200, 202, 204 and 206. For example, each of the perforated plates 32, 34, 36 and 38 may be formed from an 18 gauge 304 stainless steel sheet with about 0.25 inches circular holes, with the circular holes being spaced about 5/16 inches center-to-center. The presence in the adsorber 12 of a perforated plate 32, 34, 36 or 38 results in the VOC-contaminated airstream 22 flowing through a cross-sectional area that is effectively about 58% of the cross-sectional area of an adsorber 12 without a perforated plate therein. Similarly, the presence of a wire mesh screen 40, 42, 44 or 46 results in the VOC-contaminated airstream 22 flowing in a cross-sectional area that is effectively about 53.3% of the cross-sectional area of an adsorber 12 without a perforated plate therein. Thus the resultant area above one of the wire mesh screens 40, 42, 44 and 46 through which the VOC-contaminated airstream flows through is about 30.9% (58% open area above one of the perforated plates 32, 34, 36 and 38 multiplied with the 53.3% open area above one of the wire mesh screens 40, 42, 44 and 46). Thus if the VOC-contaminated airstream 22 initially enters the inlet port 24 at an average linear velocity of about 157.6 linear feet per minute, then the velocity of the VOC-contaminated airstream 22 above one of the mesh screens 40, 42, 44 and 46 will be about 510 feet/minute (157.6 feet/minute divided by 30.9%). The Dow XUS-43493.01, screened to 20 to 50 mesh, will become entrained or suspended if the air velocity rate of the VOC-contaminated airstream 22 is at about or above 510 feet per minute. Causing the adsorbent particles 48 to be entrained is unlike the situation with a fluidized bed adsorber (not shown) wherein bubbles of air are formed as a VOC-contaminated airstream passes through adsorbent particles in a fluidized bed.

Since the adsorbent particles 48 are separated from each other when entrained in the VOC-contaminated airstream 22, the surface area of the entrained adsorbent particles 48 are fully exposed to the VOCs in the VOC-contaminated airstream 22. This permits the adsorbent particles 48 to efficiently adsorb the VOCs. Therefore, the adsorbent particles 48, which are entrained, are most likely to adsorb the volatile organic compounds in the VOC-contaminated airstream 22. The entrained adsorbent particles 48 are then drawn into the weir 56 with an opening 57 and the weir 58 with an opening 59. The weirs 56 and 58 respectively have the downspouts 60 and 62.

Figure 8A:
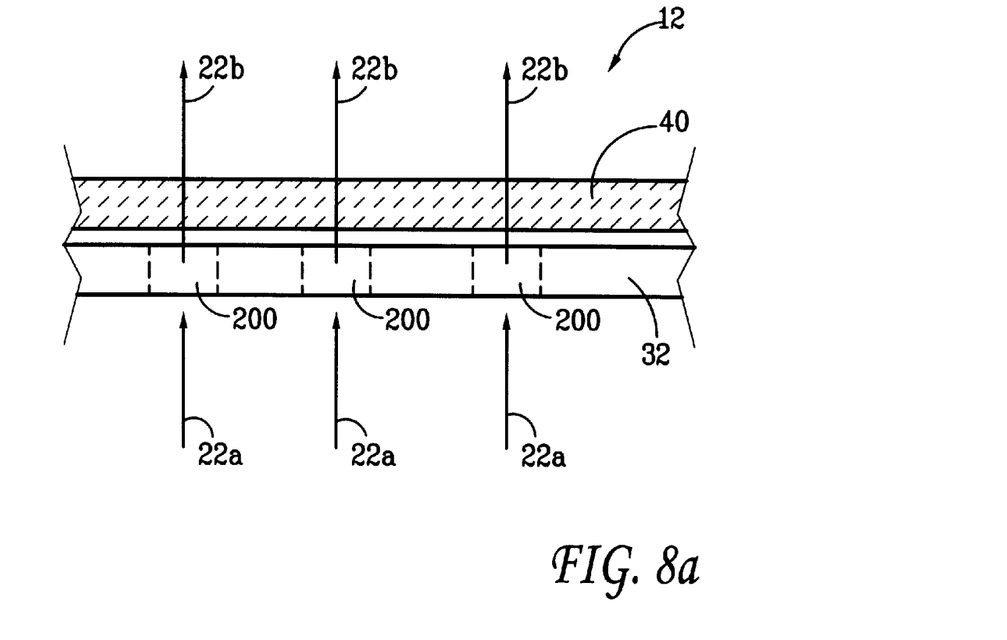
FIG. 8a is a partial front elevational view of an adsorber of the present invention wherein a VOC-contaminated airstream flows through a perforated plate and mesh screen, and increases in velocity.

As best illustrated in FIG. 8a, the VOC-contaminated airstream 22a initially approaches a perforated plate 32 at a predetermined velocity rate (for example, at about 157.6 linear feet per minute). The VOC-contaminated airstream 22a passes through perforations 200 in the perforated plate 32 and through the mesh screen 40, and emerges as the high velocity VOC-contaminated airstream 22b. In the embodiment of FIG. 8a, the perforated plate 32 has a plurality of uniformly-spaced perforations 200 which are shaped as circular or cylindrically-shaped holes. As mentioned previously, the effective open area above the mesh screen 40 is less than the cross-sectional area of an adsorber 12 without the perforated plate 32 and the mesh screen 40 therein. For example, the open area above the mesh screen 40 may be about 30.9% of the cross-sectional area of the adsorber 12 without the perforated plate 32 and the mesh screen 40. If the VOC-contaminated airstream 22a has an average linear velocity rate of about 157.6 linear feet per minute, then the average linear velocity rate of the high velocity VOC-contaminated airstream 22b will be about 510 feet per minute.

The higher velocity rate of the high velocity VOC-contaminated airstream 22b is due to the venturi effect. Specifically, if a constriction is placed in a closed channel in which a stream of fluid or gas flows, then there will be an increase in velocity of the flowing gas or fluid, and hence an increase in kinetic energy, at the point of constriction. In this invention, a stream of VOC-contaminated airstream 22a flows through a closed channel (i.e., the adsorber 12). The constriction (i.e., the velocity plate 32 with the perforations 200 and the mesh screen 40) increases the velocity and hence the kinetic energy of the VOC-contaminated airstream 22a (shown as the high velocity VOC-contaminated airstream 22b above the mesh screen 40).

Figure 8B:
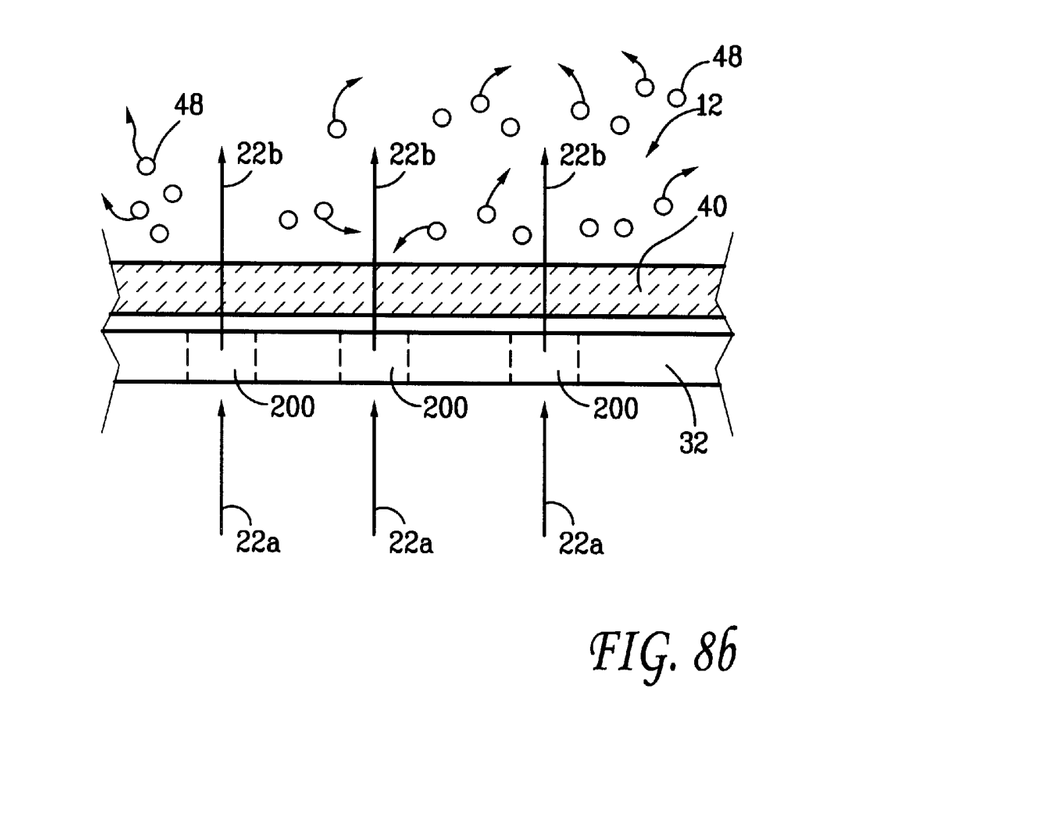
FIG. 8b is a partial front elevational view of an adsorber of the present invention wherein adsorbent particles are entrained in a VOC-contaminated airstream.

Reference is now made to FIG. 8b. Since the high velocity VOC-contaminated airstream 22b has an increased velocity and kinetic energy, the adsorbent particles 48 will become entrained in the high velocity VOC-contaminated airstream 22b. The adsorbent particles 48 are suspended in the high velocity VOC-contaminated airstream 22b. When suspended, the adsorbent particles 48 ebullate as if the adsorbent particles 48 are similar to Ping-Pong balls randomly moving vertically and moving in other freedoms of movement. The adsorbent particles 48, which are entrained, adsorb the volatile organic compounds in the high velocity VOC-contaminated airstream 22b.

Figure 8C:
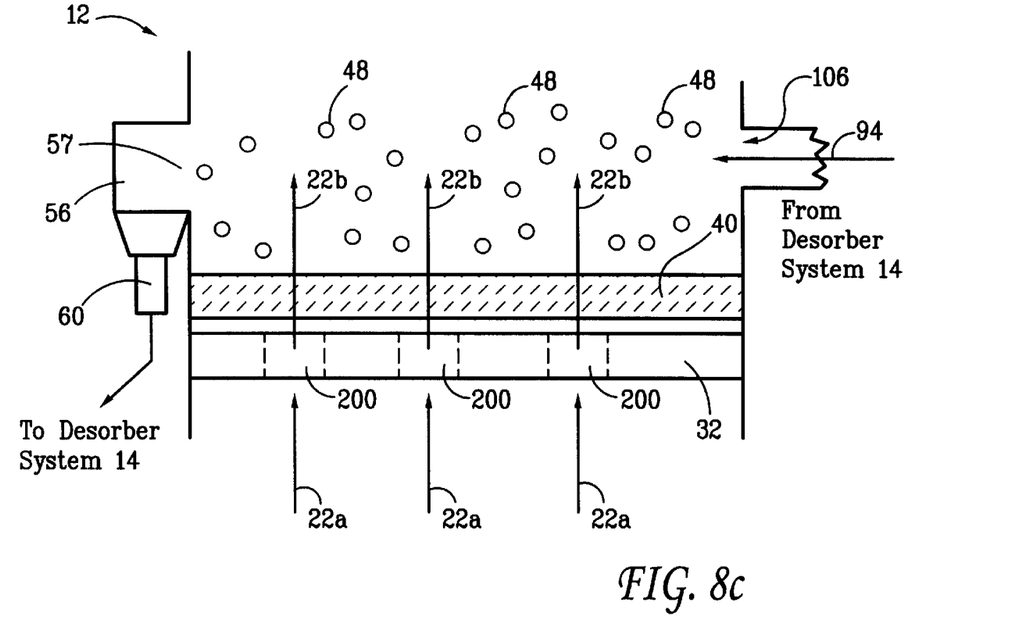
FIG. 8c is a partial front elevational view of an adsorber of the present invention wherein adsorbent particles are entrained in a VOC-contaminated airstream or are recycled into the adsorber for adsorption of volatile organic compounds.

Reference is now made to FIG. 8c. The adsorbent particles 48, which are entrained, fall into the weir 56 via opening 57 and then into the desorber system 14 (see FIG. 1) for desorption of volatile organic compounds. The adsorbent particles 48 which do not fall into the weir 56, lose velocity and fall downwardly to the mesh screen 40. The adsorbent particles 48 are entrained repeatedly above the mesh screen 40 for adsorption of volatile organic compounds, until the adsorbent particles 48 fall into the weir 56. As also shown in FIG. 8c, the VOC-cleansed adsorbent particles 94, which exit from the desorber system 14 (see FIG. 1), enter the adsorber 12 from the adsorber inlet port 106. The VOC-cleansed adsorbent particles 94 are then entrained in the high velocity VOC-contaminated airstream 22b for adsorption of volatile organic compounds.

Figure 8D:
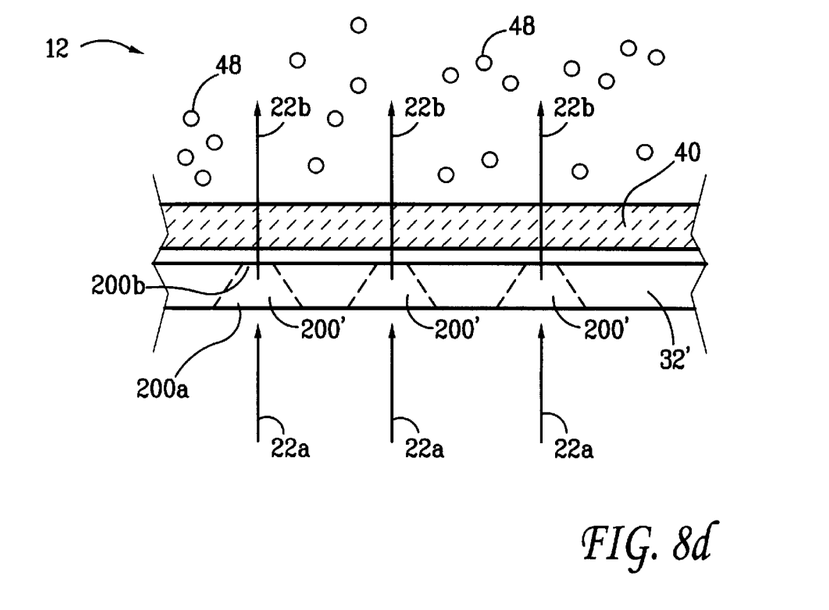
FIG. 8d is a partial front elevational view of an adsorber of the present invention with a second embodiment of the perforated plate.

Referring now to FIG. 8d, a partial front elevational view of the adsorber 12 of the present invention is shown with a second embodiment of the perforated plate (shown as 32'). The perforated plate 32' is shown as comprising a plurality of uniformly-spaced perforations 200' which are shaped as cone-shape holes, decreasing in cross-sectional area from the first end 200a to the second end 200b.

Figure 4:
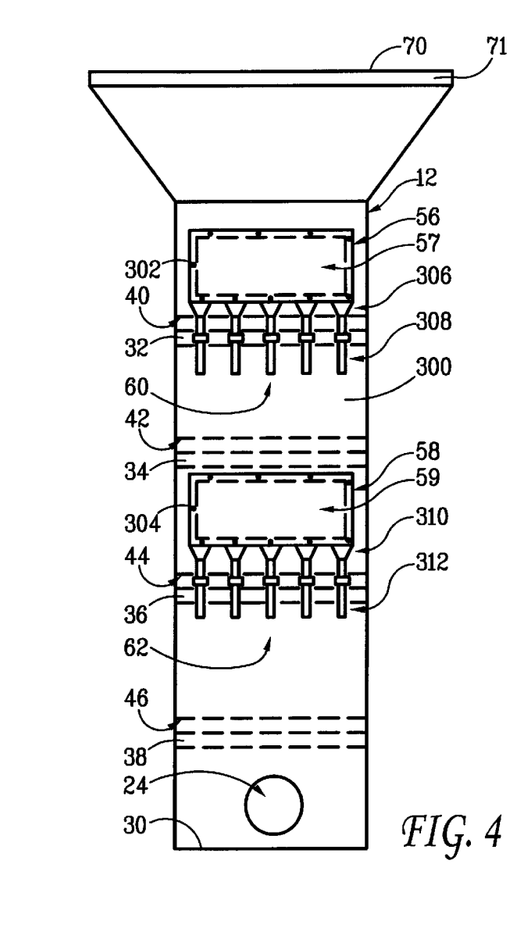
FIG. 4 is a view of a first side of the adsorber of the present invention.

Referring now to FIG. 4, the weirs 56 and 58 are made of airtight boxes that are sealed by a gasket material (not shown). The weirs 56 and 58 are attached to one side 300 of the adsorber 12 by the bolts 302 and 304, respectively. Preferably, additional weirs (not shown) are attached to a second side 400 (see FIG. 5) of the adsorber 12. The downspouts 60 preferably include a plurality of funnels 306 which are attached to the corresponding tubes 308. Similarly, the downspouts 62 preferably include a plurality of funnels 310 which are attached to the corresponding tubes 312.

As best illustrated in FIG. 3, the adsorbent particles 48, which fall into the weir 56 through the opening 57, are driven downward through the downspouts 60 by gravity. The adsorbent particles 48, which fall through the downspouts 60, exit through the opening 61, and are then mixed with the adsorbent particles 48 that are entrained above the mesh screen 42. The adsorbent particles 48, which are entrained above the mesh screen 42, are then driven through the output port 64 and into a collection weir 64'. The VOC-saturated adsorbent particles 65, which gather in the collection weir 64', are then driven into the desorber system 14 (see FIG. 1) by air pressure from the main fan 26 and by the excess weight of the VOCs adsorbed by the VOC-saturated adsorbent particles 65.

Similarly, the adsorbent particles 48, which are entrained above the mesh screen 44, are drawn into the weir 58 through the opening 59. The adsorbent particles 48 in the weir 58 are then driven downward through the downspouts 62 by gravity. The adsorbent particles 48, which gather in the weir 58, exit through the opening 63, and are then mixed with the adsorbent particles 48 that are entrained above the mesh screen 46. The adsorbent particles 48, which are entrained above the mesh screen 46, are then driven through the output port 66 and into a collection weir 66'. The VOC-saturated adsorbent particles 67, which gather in the collection weir 66', are then driven into the desorber 16 (see FIG. 1) by pressure from the main fan 26 (see FIG. 1) and from the excess weight of the VOCs adsorbed by the VOC-saturated adsorbent particles 67.

Figure 5:
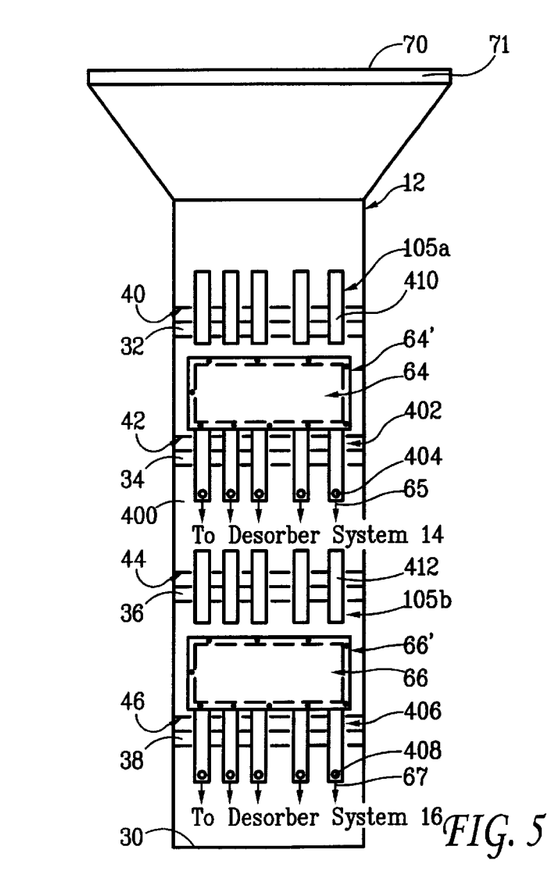
FIG. 5 is a view of a second side of the adsorber of the present invention.

Referring now to FIG. 5, a plurality of conduits 402 couples the collection weir 64' to the desorber system 14 (see FIG. 1). The conduits 402 have the valves 404 for controlling the flow of the VOC-saturated adsorbent particles 65 from the adsorber 12 to the desorber system 14 (see FIG. 1). For example, the valves 404 may be adjusted to reduce the flow of the VOC-saturated adsorbent particles 65 from the adsorber 12. The flow of the VOC-saturated adsorbent particles 65 from the adsorber 12 is preferably reduced if the VOC-containing airstream 22 (see FIG. 1) has a low concentration of VOCs. Alternatively, the flow of the VOC-saturated adsorbent particles 65 from the adsorber 12 is preferably reduced for some types of VOCs. For example, if the VOC-containing airstream 22 (see FIG. 1) contains styrene, then the flow of the VOC-saturated adsorbent particles 65 from the adsorber 12 is preferably reduced, since a larger percentage of weight of styrene can be adsorbed by the VOC-saturated adsorbent particles 65 or/and by the entrained adsorbent particles 48 (see FIG. 1). In another alternative, the flow of the VOC-saturated adsorbent particles 65 from the adsorber 12 is preferably reduced if the VOC-saturated adsorbent particles 65 have a large capacity to adsorb VOCs.

Similarly, a plurality of conduits 406 couples the collection weir 66' to the desorber system 16 (see FIG. 1). The conduits 406 have valves 408 for controlling the flow of the VOC-saturated adsorbent particles 65 from the adsorber 12.

Referring back to FIG. 1, some of the adsorbent particles 48 that are entrained do not enter the weirs 56 and 58. The adsorbent particles 48 that rise above the mesh screens 40, 42, 44 and 46 lose velocity as the adsorbent particles 48 move farther away from the mesh screens 40, 42, 44 and 46. The velocity of the adsorbent particles 48 decreases from areas in the adsorber 12 farther away from the mesh screens 40, 42, 44 and 46, since the effective area that are farther away from the mesh screens approaches the cross sectional area of the adsorber 12. After the adsorbent particles 48 which are entrained decrease in velocity, the adsorbent particles 48 fall back towards the mesh screens 40, 42, 44 and 46 under the influence of gravity. Thus the mesh screens 40, 42, 44 and 46 effective act as a reservoir for the adsorbent particles 48, thereby reducing the number of cycles through which the adsorbent particles 48 must be desorbed and recycled back into the adsorber 12 as conventional adsorbers require.

As shown in FIG. 1, the adsorbent particles 48 adsorb the VOCs in the VOC-contaminated airstream 22, thereby resulting in a VOC-free or clean air 68 to exit from the output port 70. The VOC-free air 68 is released into the environment or directed to another use.

The cross-sectional area of the adsorber 12 near the output port 70 upwardly increases, thereby reducing the velocity of the VOC-free air 68 near the output port 70. By reducing the velocity of the VOC-free air 68, the adsorbent particles 48, which are entrained above the mesh screen 40, are prevented from being discharged from the output port 70. One method to increase the cross-sectional area of the adsorber 12 near the output port 70 is by attaching weirs (not shown) on the adsorber 12 near the output port 70. Preferably, a coarse filter (not shown) or another functionally equivalent filter is placed in the filter housing 71 of the adsorber 12 to further insure that the adsorbent particles 48 are prevented from exiting the output port 70. The coarse filter that is preferably used in this invention is similar to a dust filter used in air-conditioning systems.

In the preferred embodiment, one desorber system is coupled to an adsorber with two perforated plates with corresponding mesh screens. As shown in FIG. 1, the perforated plates 32 and 34 with the corresponding mesh screens 40 and 42, respectively, are coupled to the desorber system 14. Similarly, the perforated plates 36 and 38 with the corresponding mesh screens 44 and 46, respectively, are coupled to the desorber system 16. The preferred embodiment may be modified so that a plurality of desorber systems (with smaller diameter and/or length than the desorber system 14 or 16) is coupled in parallel for every two perforated plates. Alternatively, the preferred embodiment may be modified so that only a single desorber system (not shown) is coupled to all of the perforated plates 32, 34, 36 and 38.

The VOC-saturated adsorbent particles 65 and 67 respectively enter the desorber system 14 and 16. The VOC-saturated adsorbent particles 65 and 67 are then respectively exposed to the heated airstream 84. The heated airstream 84 is generated by the thermal oxidizer 20 and flows through conduit 86. The heated airstream 84 then enters into the input port 87 of the desorber 14 and enters into the input port 88 of the desorber 16.

Figure 6:
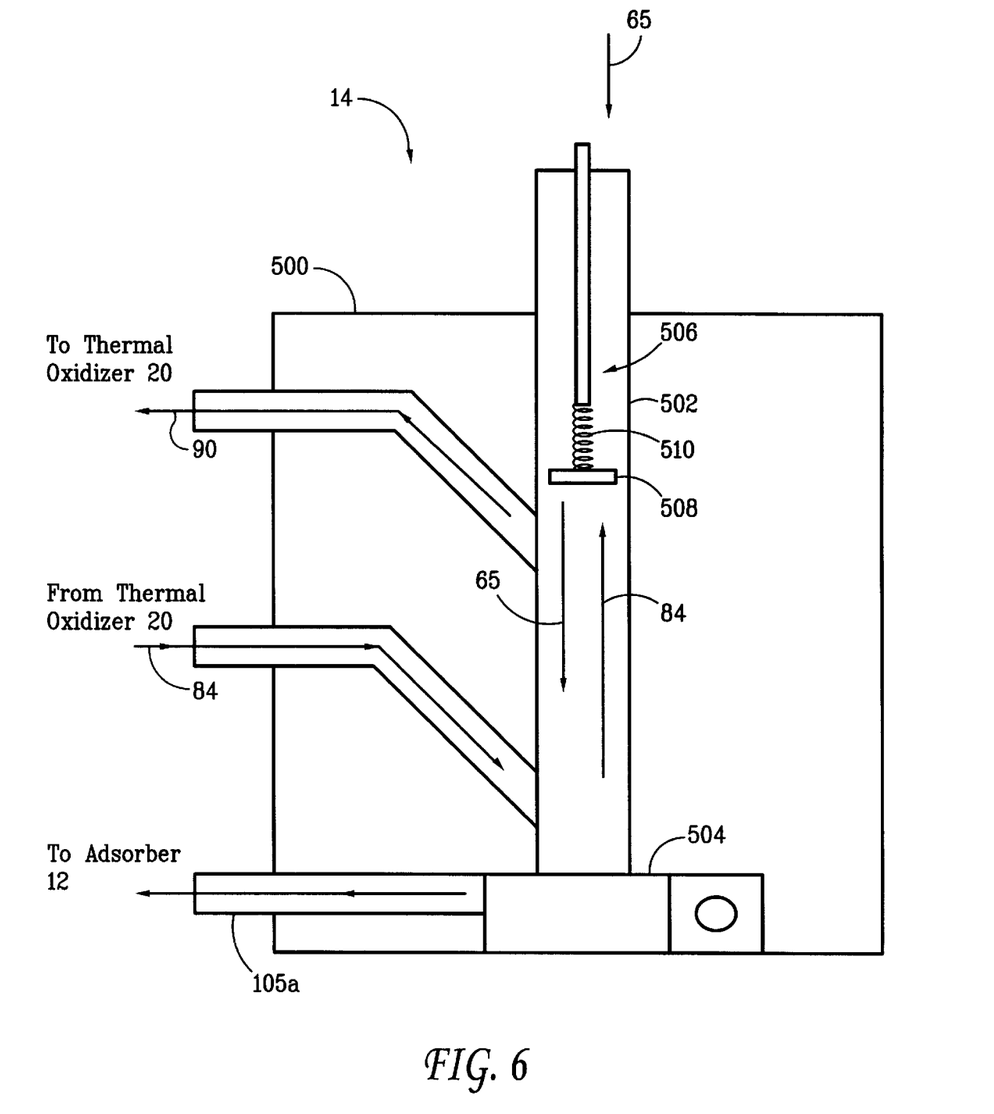
FIG. 6 is a cross-sectional view of a desorber system of the present invention.

Referring now to FIG. 6, a desorber system 14 is shown in additional detail. The desorber system 14 preferably includes an insulated desorber enclosure 500, a hollow desorber column member 502 disposed within the insulated desorber enclosure 500, and a collector 504 near to the hollow desorber column member 502. A deflector 506 is disposed within the hollow desorber column member 502 for evenly distributing the flow of the VOC-saturated adsorbent particles 65 within the hollow desorber column member 502. The deflector 506 preferably comprises a coin-shaped member 508 attached to the hollow desorber column member 502 by a coil spring 510. However, other functionally equivalent devices may be used for evenly distributing the VOC-saturated adsorbent particles 65 within the hollow desorber column member 502. The coin-shaped member 508 serves to spread out the VOC-saturated adsorbent particles 65 within the hollow desorber column member 502, thereby fully exposing the surfaces of the VOC-saturated adsorbent particles 65 to the heated airstream 84. As the surfaces of the VOC-saturated adsorbent particles 65 are exposed to the heated airstream 84, the VOCs are removed from or "flashed off" the surface of the VOC-saturated adsorbent particles 65.

The cross-sectional area of the hollow desorber column member 502 is typically about 1/40 of the cross-sectional area of the adsorber 12 (see FIG. 1). For example, if the adsorber 12 (see FIG. 1) has a cross-sectional area of 10 square feet, then the hollow desorber column member 502 has a cross-sectional area of about 0.25 square feet. However, the cross-sectional area ratio between the hollow desorber column member 502 and the adsorber 12 (see FIG. 1) can range from about 1/10 to about 1/50, depending on customer requirements. Assuming the cross-sectional area ratio between the hollow desorber column member 502 and the adsorber 12 (see FIG. 1) is set at about 1/40, then the airflow of the heated airstream 84 is consequently at about 1/40 of the airflow of the VOC-contaminated airstream 22 (see FIG. 1). This smaller amount of the airflow of the heated airstream 84 results in fuel savings for the present invention when compared to conventional desorber systems.

The heated airstream 84 serves to disassociate or "flash off" VOCs from the VOC-saturated adsorbent particles 65. The airflow of the heated airstream 84 is dependent on the amount of heat required to flash off the VOCs from the VOC-saturated adsorbent particles 65. Therefore, a higher temperature of the heated airstream 84 will require a lower airflow thereof. A higher concentration of the VOC-saturated adsorbent particles 65 in the hollow desorber column member 502 will require the airflow of the heated airstream 84 to be higher. The reduced cross-sectional ratio of the hollow desorber column member 502 permits a high concentrated amount of amount of VOC-saturated adsorbent particles 65 to be collected in the column member 502 for desorption. For example, if the hollow desorber column member 502 has a cross sectional area of about 0.35 square foot and a length of about 3 feet, then the column member 502 can collect a high concentrated amount of about 60 pounds/hour of VOC-saturated adsorbent particles 502 for adsorption.

For the Dowex V493 adsorbent particle, the maximum temperature permitted without damaging the adsorbent particle is about 257 degrees Fahrenheit. In contrast, the hollow desorber column member 502 is typically operated at about 400 degrees Fahrenheit. The VOC-saturated adsorbent particles 65 made of Dowex V493 will not be damaged at about 400 degrees Fahrenheit and yet will be desorbed of VOCs, provided the VOC-saturated adsorbent particles 65 are in the hollow desorber column member 502 for a maximum of about two seconds. The two seconds' time frame is sufficient to heat the VOC-saturated adsorbent particles 65 so that the VOCs are flashed off from the surface thereof.

As best illustrated in FIG. 1, the VOC-saturated adsorbent particles 65 and 67 that have been cleansed of VOCs fall into the collectors (not shown) in the desorber systems 14 and 16. As previously stated in the discussion of FIG. 6, a collector 504 may be disposed in a desorber system 14. The VOC-cleansed adsorbent particles 94 and 96 that accumulate in the collectors (not shown) respectively exit the output ports 98 and 100. The VOC-cleansed adsorbent particles 94 and 96 are then respectively transported by the airlift fans 102 and 104 through respective conduits 105a and 105b. The VOC-cleansed adsorbent particles 94 and 96 then respectively enter the adsorber inlet ports 106 and 108 for use in a new cycle of adsorption of VOCs. Preferably, the airlift fans 102 and 104 are standard regenerative blowers. In addition, the conduit 105a preferably comprises a plurality of tubes 410 (see FIG. 5) coupled to the desorber system 14. Similarly, the conduit 105b preferably comprises a plurality of tubes 412 (see FIG. 5) coupled to the desorber system 16.

For the system 10, material balance of the adsorbent particles is preferred. For example, if 10 pounds/hour of the VOC-saturated adsorbent particles 65 and 67 are transferred from the adsorber 12 and into the desorber systems 14 and 16, respectively, then 10 pounds/hr of the VOC-cleansed adsorbent particles 94 and 96 are preferably transferred into the adsorber 12 from the collectors (not shown) in the desorber systems 14 and 16, respectively. The flow of the adsorbent particles in the system 10 of the present invention can be measured visually and/or by computer monitoring. The air pressures, air flow, and temperature in the system 10 can also be measured by computer monitoring. Other methods are available for measuring the adsorbent particles' flow, the air pressures, the air flow, and the temperature in the system 10 of the present invention.

The disassociated VOCs are represented by and flow in the direction of the arrows 90 and 92. The disassociated VOCs 90 and 92 respectively exit from the output port 110 of the desorber system 14, and the output port 112 of the desorber system 16. The disassociated VOCs 90 and 92 are respectively driven from the output ports 110 and 112 by the air pressures from the heated airstream 84 and by the air pressure generated by the desorber fan 136. The disassociated VOCs 90 and 92 are then transported by air pressures through the air filter 114. The air filter 114 serves to prevent the VOC-saturated adsorbent particles 65 and 67 from entering and contaminating the catalyst 116 of the thermal oxidizer 20. As shown in FIG. 1, the thermal oxidizer 20 further comprises a burner 118. If the thermal oxidizer 20 includes only the burner 118, then the airfilter 114 is not required in the thermal oxidizer 20.

During operation of the thermal oxidizer 20, the disassociated VOCs 90 and 92 are oxidized into air and water by the thermal oxidizer 20. The exhaust heat 120 results from the oxidization of the disassociated VOCs 90 and 92 and from the thermal oxidizer 20 heating source. The exhaust heat 120 is driven by the oxidizer fan 122 through the catalyst 116, catalyst pre-heat exchanger 124 and desorber heat exchanger 18. Ambient air, represented by and flowing in the direction of the arrow 126, enters through the input port 130 of the desorber heat exchanger 18. The heated airstream 120 generates the heated airstream 84 which flows in the conduit 86 and the conduit 138. A desorber fan 136 serves to provide air pressure for driving the heated airstream 84 through the conduit 86 and into the desorber system input ports 87 and 88. The heated airstream 84 in the conduit 138 further serves to provide additional heat for the oxidization of the disassociated VOCs 90 and 92.

The configuration of the thermal oxidizer 20 may vary depending on design requirements. For example, some applications of system 10 may only require the burner 118 to serve as a component of the thermal oxidizer 20.

Figure 7:
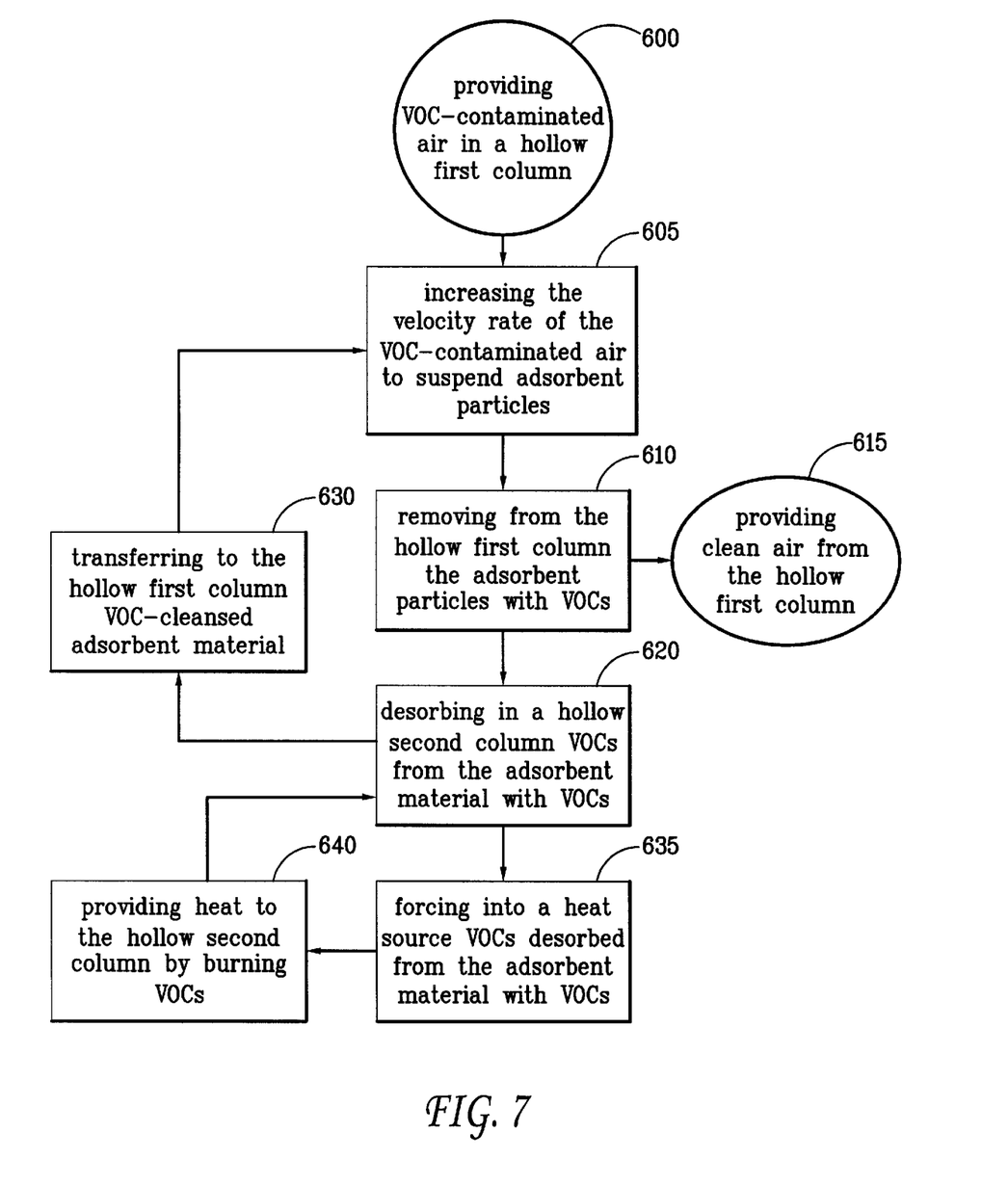
FIG. 7 is a flowchart describing a method of the present invention.

The discussion above and the flowchart of FIG. 7 illustrate one cycle of the system 10 and a method of the present invention. In step 600, the VOC-contaminated airstream 22 (see FIG. 1) is introduced into the adsorber 12 (see FIG. 1). In step 605, the velocity rate of the VOC-contaminated airstream 22 (see FIG. 1) is increased such that the adsorbent particles 48 (see FIG. 1) in the adsorber 12 (see FIG. 1) are suspended or entrained. The velocity of the VOC-contaminated airstream 22 is increased by the perforated plates 32, 34, 36 and 38 (see FIG. 1) with the corresponding mesh screens 40, 42, 44, and 46. By suspending the adsorbent particles 48 (see FIG. 1) in the VOC-contaminated airstream 22 (see FIG. 1), the VOCs in the VOC-contaminated airstream 22 are adsorbed by the adsorbent particles 48. In step 610, the VOC-saturated adsorbent particles 65 and 67 (see FIG. 1) are transferred from the adsorber 12 (see FIG. 1) to the desorber systems 14 and 16 (see FIG. 1), respectively. Since the adsorbent particles 48 (see FIG. 1) adsorb the VOCs in the VOC-contaminated airstream 22 (see FIG. 1), the VOC-free or clean air 68 (see FIG. 1) exits from the adsorber 12 (see FIG. 1), as shown in step 615. In step 620, the VOC-saturated adsorbent particles 65 and 67 (see FIG. 1) are desorbed in the desorber systems 14 and 16 (see FIG. 1), respectively. In step 630, the VOC-cleansed adsorbent particles 94 and 96 (see FIG. 1) are transferred from the desorber systems 14 and 16 (see FIG. 1), respectively, to the adsorber 12 (see FIG. 1) for use in another cycle of adsorption. In step 635, the disassociated VOCs 90 and 92 (see FIG. 1), which has been removed respectively from the VOC-saturated adsorbent particles 65 and 67 (see FIG. 1), are forced into the thermal oxidizer or heat source 20 (see FIG. 1). In the thermal oxidizer 20 (see FIG. 1), the disassociated VOCs 90 and 92 (see FIG. 1) are then oxidized, thereby generating exhaust heat 120 (see FIG. 1). In step 640, the exhaust heat 120 (see FIG. 1) is provided to the desorber systems 14 and 16 (see FIG. 1) for removing VOCs from the VOC-saturated adsorbent particles 14 and 16 (see FIG. 1).

In the preferred embodiment, the cycle of FIG. 7 is constantly repeated, with the adsorbent particles in the system 10 being continuously recycled.

While the present invention has been described herein with reference to particular embodiments thereof, a latitude of modification, various changes and substitutions are intended in the foregoing disclosure, and it will be appreciated that in some instances some feature of the invention will be employed without a corresponding use of other features without departing from the scope of the invention as set forth.

I claim:

1. A method for removing volatile organic compounds from a stream of contaminated air with use of an adsorbent material, said method comprising the steps of:
   (a) forcing a stream of contaminated air through a first hollow member, said first hollow member having a first end into which said stream is forced at a velocity, and a second end from which clean air is released;
   (b) providing an adsorbent material in said first hollow member of step (a);
   (c) accelerating said stream to a higher velocity sufficient to cause said adsorbent material to be entrained in said stream;
   (d) removing said adsorbent material which contains said volatile organic compounds from said first hollow member; and
   (e) desorbing said volatile organic compounds from said adsorbent material which contains said volatile organic compounds in step (d) in a second hollow member.

2. The method of claim 1 wherein said desorbing step (e) further comprises the steps of:
   (i) collecting a high concentration of said adsorbent material which contains said volatile organic compounds; and
   (ii) heating at high temperatures said adsorbent material which contains said volatile organic compounds to release said volatile organic compounds.

3. The method of claim 1 wherein said removing step (d) further comprises the steps of:
   controlling a rate in which said adsorbent material which contains said volatile organic compounds are removed from said first hollow member.

4. The method of claim 1 further comprising the step of:
   (f) forcing said volatile organic compounds from said desorbing step (e) into a heat source.

5. The method of claim 1 further comprising the step of:
   (g) providing said second hollow member of step (e) with heat from a heat source, said heat partially provided by burning said volatile organic compounds of step (f) in said heat source.

6. The method of claim 1 further comprising the step of:
   (h) transferring to said first hollow member said adsorbent material of step (e) which has been removed of said volatile organic compounds.

7. A method for removing volatile organic compounds from a stream of contaminated air with use of an adsorbent material, said method comprising the steps of:
   (a) forcing a stream of contaminated air through a first hollow member, said first hollow member having a first end into which said stream is forced at a velocity, and a second end from which clean air is released;
   (b) providing an adsorbent material in said first hollow member of step (a);
   (c) accelerating said stream to a higher velocity sufficient to entrain said adsorbent material in said stream; and
   (d) removing said adsorbent material which is saturated with volatile organic compounds from said first hollow member.

8. A method for removing volatile organic compounds from a stream of contaminated air with use of an adsorbent material, said method comprising the steps of:
   (a) forcing a stream of contaminated air through a first hollow member at a velocity;
   (b) providing an adsorbent material in said first hollow member of step (a);
   (c) accelerating said stream to a higher velocity sufficient to entrain said adsorbent material in said stream;
   (d) transferring said adsorbent material from a first area in said first hollow member to a second area in said first hollow member;
   (e) removing said adsorbent material which contains said volatile organic compounds from said first hollow member; and
   (f) desorbing in a second hollow member said volatile organic compounds from said adsorbent material which contains said volatile organic compounds of step (e).

9. A method for removing volatile organic compounds from a stream of contaminated air with use of an adsorbent material, said method comprising the steps of:
   (a) forcing a stream of contaminated air through a first hollow member, said first hollow member having a first end into which said stream is forced at a velocity, a second end from which clean air is released, and an adsorbent material therein;
   (b) accelerating said stream to a higher velocity sufficient to entrain said adsorbent material in said stream;
   (c) transferring said adsorbent material from a first area in said first hollow member to a second area in said first hollow member;
   (d) removing said adsorbent material which contains said volatile organic compounds from said first hollow member; and
   (e) desorbing said volatile organic compounds from said adsorbent material which contains said volatile organic compounds of step (d) in a second hollow member.

10. A method for removing volatile organic compounds from a stream of contaminated air with use of an adsorbent material, said method comprising the steps of:
    (a) forcing a stream of contaminated air through a chamber at a velocity;
    (b) providing an adsorbent material in said chamber of step (a); and
    (c) accelerating said stream to a higher velocity sufficient to entrain said adsorbent material in said stream.

11. An apparatus for removing volatile organic compounds from a stream of contaminated air with use of an adsorbent material, comprising:
    means for containing a stream of contaminated air and an adsorbent material, said means for containing having a first end into which said stream is forced at a velocity, and a second end from which clean air is released;
    means, disposed between said first end and said second end, for accelerating said stream to a higher velocity, said higher velocity being sufficient to entrain said adsorbent material in said stream, said adsorbent material acting to adsorb volatile organic compounds in said stream; and
    means, coupled to said means for containing and to a heat source, for reconditioning said adsorbent material.

12. The apparatus of claim 11 wherein said accelerating means further comprises:
    barrier means, disposed adjacent to said accelerating means, for preventing said adsorbent material from transferring across said accelerating means.

13. The apparatus of claim 12 wherein said barrier means is disposed above said accelerating means.

14. The apparatus of claim 11 wherein said means for containing further comprises:

second means, disposed between said first end and said accelerating means, for accelerating said gas stream to a higher velocity sufficient to entrain said adsorbent material in said stream, said adsorbent material acting to adsorb said volatile organic compounds in said stream.

15. The apparatus of claim 14 further comprising:

means, attached to said means for containing, for collecting said adsorbent material which is suspended in said stream, said means for collecting providing a pathway for an adsorbent material which is suspended adjacent to said accelerating means to transfer to an area adjacent to said second accelerating means.

16. The apparatus of claim 11 wherein said means for containing increases in cross-sectional area near said second end.

17. The apparatus of claim 11 wherein said means for containing further comprises:

a filter means for preventing said adsorbent material which is suspended in said stream from being released from said second end.

18. The apparatus of claim 11 wherein said means for containing further comprises:

means for distributing a flow of said stream uniformly within said means for containing, said means for distributing is located near said first end.

19. The apparatus of claim 11 wherein said means for reconditioning further comprises:

a first opening connected to said heat source by a first conduit, for emitting said volatile organic compounds from said means for reconditioning to said heat source; and a second opening connected to said heat source by a second conduit, for receiving heat from said heat source for removing said volatile organic compounds from said adsorbent material which contains said volatile organic compounds.

20. The apparatus of claim 11 further comprising:

means, coupled to said means for reconditioning, for accumulating said adsorbent material which has been removed of said volatile organic compounds.

21. The apparatus of claim 20 further comprising:

means for transferring said adsorbent material from said means for accumulating to said means for containing.

22. The apparatus of claim 11 wherein said means for reconditioning has a cross-sectional area less than a cross-sectional area of said means for containing.

23. The apparatus of claim 11 wherein said means for reconditioning further comprises:

means for uniformly distributing a flow in said means for reconditioning of said adsorbent material which contains said volatile organic compounds.

24. An apparatus for removing volatile organic compounds from a stream of contaminated air with use of an adsorbent material, comprising:

means for containing a stream of contaminated air and an adsorbent material, said means for containing having a first end into which said stream is forced at a velocity and a second end from which clean air is released; and means, disposed between said first end and said second end, for accelerating said stream to a higher velocity sufficient to entrain said adsorbent material in said stream, said adsorbent material acting to adsorb volatile organic compounds in said stream.

25. The apparatus of claim 14 wherein said accelerating means further comprises:

barrier means, disposed adjacent to said accelerating means, for preventing said adsorbent material from transferring across said accelerating means.

26. The apparatus of claim 25 wherein said barrier means is disposed above said accelerating means.

27. The apparatus of claim 24 wherein said means for containing further comprises:

second means, disposed between said first end and said accelerating means, for accelerating said gas stream to a higher velocity sufficient to entrain said adsorbent material in said stream, said adsorbent material acting to adsorb said volatile organic compounds in said stream.

28. The apparatus of claim 27 further comprising:

means, attached to said means for containing, for collecting said adsorbent material which is suspended in said stream, said means for collecting providing a pathway for an adsorbent material which is suspended adjacent to said accelerating means to transfer to an area adjacent to said second accelerating means.

29. The apparatus of claim 24 wherein said means for containing increases in cross-sectional area near said second end.

30. The apparatus of claim 24 wherein said means for containing further comprises:

a filter means for preventing said adsorbent material which is suspended in said stream from being released from said second end.

31. The apparatus of claim 24 wherein said means for containing further comprises:

means for distributing a flow of said stream uniformly within said means for containing, said means for distributing is located near said first end.

32. An apparatus for removing volatile organic compounds from a stream of contaminated air with use of an adsorbent material, comprising:

a first hollow member for containing a stream of contaminated air and an adsorbent material, said first hollow member having a first end into which said stream is forced at a velocity and a second end from which clean air is released;

a perforated member, disposed between said first end and said second end, for accelerating said stream to a higher velocity sufficient to entrain said adsorbent material in said stream, said adsorbent material acting to adsorb volatile organic compounds in said stream; and a second hollow member, coupled to said first hollow member and to a heat source, for reconditioning said adsorbent material.

33. The apparatus of claim 32 further comprising:

a mesh member, disposed adjacent to said perforated member, for preventing said adsorbent material from transferring across said perforated member.

34. The apparatus of claim 32 wherein said second hollow member further comprises:

a distributing member for uniformly distributing a flow in said second hollow member of said adsorbent material which contains said volatile organic compounds.

35. The apparatus of claim 32 wherein said second hollow member further comprises:

a first opening connected to said heat source by a first conduit, for emitting said volatile organic compounds from said means for reconditioning to said heat source; and a second opening connected to said heat source by a second conduit, for receiving heat from said heat source for removing said volatile organic compounds from said adsorbent material which contains said volatile organic compounds.

36. The apparatus of claim 32 further comprising:

a collector, adjacent said second hollow member, for accumulating said adsorbent material which has been removed of said volatile organic compounds.

37. The apparatus of claim 32 wherein said second hollow member has a cross-sectional area less than a cross-sectional area of said first hollow member.

38. The apparatus of claim 32 wherein said perforated member includes a plurality of cylindrically-shaped holes.

39. The apparatus of claim 32 wherein said perforated member includes a plurality of cone-shaped holes.

40. An apparatus for removing volatile organic compounds from a stream of contaminated air with use of an adsorbent material, comprising:

an adsorption chamber for containing a stream of contaminated air and an adsorbent material, said adsorption chamber having a first end into which said stream is forced at a velocity and a second end from which clean air is released; and a perforated member, disposed between said first end and said second end, for accelerating said stream to a higher velocity sufficient to entrain said adsorbent material in said stream, said adsorbent material acting to adsorb volatile organic compounds in said stream.

41. The apparatus of claim 40 further comprising:

a mesh member, disposed adjacent to said perforated member, for preventing said adsorbent material from transferring across said perforated member.

42. The apparatus of claim 40 wherein said perforated member includes a plurality of cylindrically-shaped holes.

43. The apparatus of claim 40 wherein said perforated member includes a plurality of cone-shaped holes.

* * * * *